H. Perry,
Fruit Gatherer.
No. 88,071.
Patented Mar. 23, 1869.
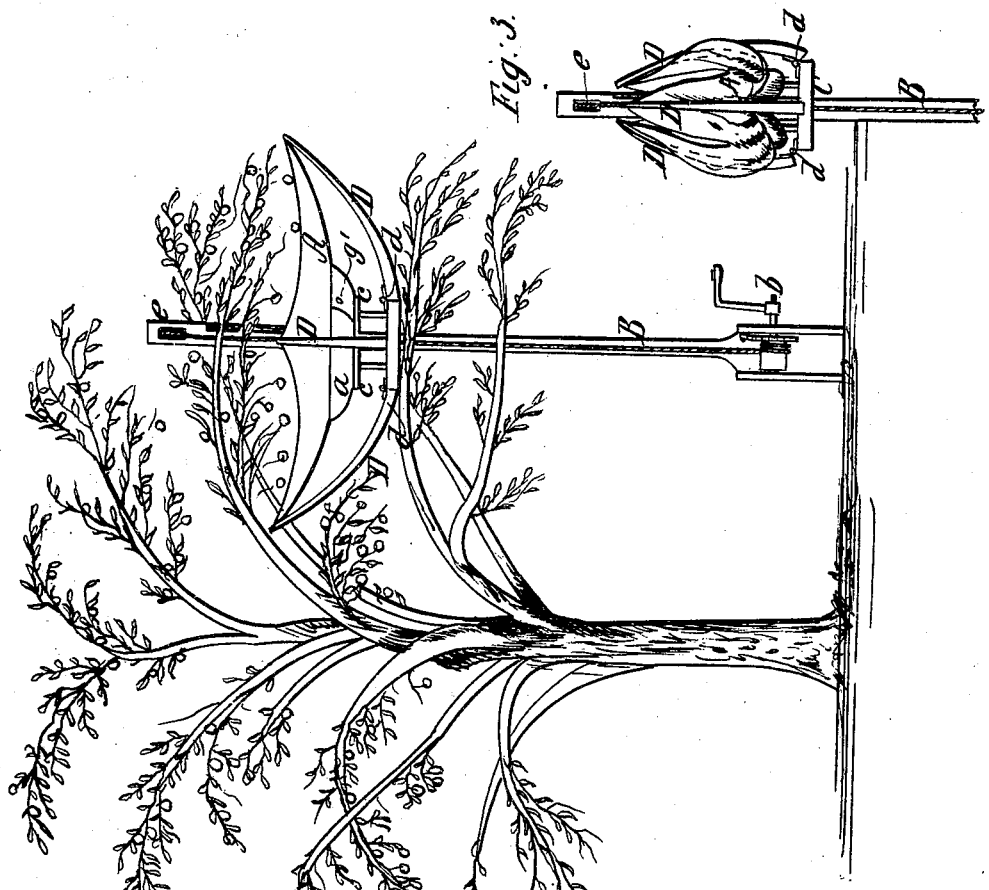
Witnesses:
Wm James Dodge
H. S. Whitney
Inventor:
Hiram Perry
per L. A. Mckey & Co.
Attys

HIRAM PERRY, OF MANLIUS, NEW YORK.

Letters Patent No. 88,071, dated March 23, 1869.

IMPROVEMENT IN FRUIT-GATHERERS.

The Schedule referred to in these Letters Patent and making part of the same.

*To all whom it may concern:*

Be it known that I, HIRAM PERRY, of Manlius, in the county of Onondaga, and State of New York, have invented a new and useful Improvement in Fruit-Gatherer; and I do hereby declare that the following is a full, clear, and exact description thereof, which will enable those skilled in the art to make and use the same, reference being had to the accompanying drawings, forming a part of this specification, in which—

Figure 1 is a perspective view;

Figure 2 is a plan view of the cloth-table; and

Figure 3 is a side view of the same when folded.

Similar letters of reference indicate like parts in all the figures.

This invention relates to certain improvements in fruit-gathering tables, whereby the fruit is not bruised upon the canvas by falling a considerable distance, or by falling upon the lower limbs of the tree while on the way to the table; and The invention consists in a table, sliding vertically upon a standard, by means of suitable hoisting-apparatus, so that the table may be hoisted up snugly to the under side of any particular limb or branch, and the fruit shaken off, and the table then removed to another branch, until the whole tree has been taken in detail; also, in a novel method of folding the table, as hereinafter more fully explained.

In the accompanying drawings—

A is the cloth-table, and

B, the standard.

C c c is a collar, which slides vertically on the standard, and has four arms, D, which extend and support the table.

These arms are secured to the sliding collar, by pivots or hinges $d\,d$, fig. 1, so that the table may be folded up for storage, or for convenience of handling, as shown in fig. 3.

The upper end of the standard is provided with a sheave, $e$, and its lower end with a winch, $b$.

A cord or rope is fastened to the upper side of the collar C, and is then carried over the sheave $e$, and down to the winch $b$, and by these means the table is elevated or lowered at will, with the greatest facility.

To the lower side of the table is appended an annular pouch, or pocket, $a$, fig. 1, which communicates with the upper face of the table, by means of a series of holes, $ff$, fig. 2.

It is operated as follows:

One man attends to the management of the table, while a second shakes the branches. The standard is elevated at the desired point, and the table hoisted up snug to the lower side of the branch, which is then shaken. The fruit falls upon the table, and in settling upon its lowest part, falls through the holes $ff$ into the annular pouch $a$, so as to be out of the way, and keep the table clear; and when this branch has been denuded, the table is changed to another, and in this manner the fruit is taken from the tree, by proceeding from limb to limb. Limbs standing upright, are pulled over the table by means of a rod, with a hook on its end.

The pouch $a$ is provided with an opening, at $g$, fig. 1, which can be buttoned up, or closed, for retaining the fruit until the table is lowered to the ground, and the fruit is then removed by the said opening $g$.

A cloth chute, reaching to the ground, can be attached to the said annular pouch, so that the fruit is delivered as fast as it falls on to the table.

For folding the apparatus, the arms D are turned up in line with the standard, as shown in fig. 3, and it then requires but little space for storing away.

The table can be made of a moderate or handy size, and two of them used under the longer branches.

The foot of the standard can be provided with a spike to enter the ground, to prevent it from slipping too easily.

By these means I obtain a very simple and efficient apparatus.

Having thus described my invention,

What I claim as new, and desire to secure by Letters Patent, is—

1. The table A, when arranged to slide vertically upon the standard B, substantially as and for the purpose herein set forth.

2. The table A $a$ C, hinged arms D $d$, standard and winch B $b$, constructed and operated as herein shown, and for the purpose described.

The above specification of my invention signed by me, this 16th day of January, 1869.

HIRAM PERRY.

Witnesses:
WM. J. DODGE,
F. A. MORLEY.